United States Patent
Fenny et al.

(10) Patent No.: US 11,022,213 B2
(45) Date of Patent: Jun. 1, 2021

(54) VARIABLE-SPEED GEAR BOX WITH HYDRAULIC SYSTEM FOR TILTROTOR AIRCRAFT

(71) Applicant: Bell Helicopter Textron Inc., Fort Worth, TX (US)

(72) Inventors: Carlos Alexander Fenny, Fort Worth, TX (US); Frank Stamps, Colleyville, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 292 days.

(21) Appl. No.: 16/105,116

(22) Filed: Aug. 20, 2018

(65) Prior Publication Data

US 2020/0056696 A1 Feb. 20, 2020

(51) Int. Cl.
| | | |
|---|---|---|
| *F16H 61/02* | (2006.01) | |
| *F16H 61/12* | (2010.01) | |
| *F16H 3/083* | (2006.01) | |
| *F16H 3/097* | (2006.01) | |
| *F16H 61/00* | (2006.01) | |
| *B64C 29/00* | (2006.01) | |
| *B64D 35/04* | (2006.01) | |
| *F16H 47/02* | (2006.01) | |

(52) U.S. Cl.
CPC ..... *F16H 61/0206* (2013.01); *B64C 29/0033* (2013.01); *B64D 35/04* (2013.01); *F16H 3/083* (2013.01); *F16H 3/097* (2013.01); *F16H 47/02* (2013.01); *F16H 61/0028* (2013.01); *F16H 61/12* (2013.01); *F16H 2061/122* (2013.01)

(58) Field of Classification Search
CPC ...... F16H 61/0206; F16H 61/12; F16H 3/083; F16H 3/097; F16H 61/0028; F16H 47/02; F16H 2061/122; F16H 45/02; F16H 47/06; F16H 41/22; F16H 47/00; F16H 47/07; F16H 47/025; F16H 47/045; F16H 45/005; F16H 1/22; F16H 33/20; B64C 29/0033; B64D 35/00; B60K 17/105; B60K 6/442
USPC .......... 74/64, 665 R, 718, 720, 665 F, 665 G
See application file for complete search history.

(56) References Cited

U.S. PATENT DOCUMENTS

| | | | |
|---|---|---|---|
| 2,427,982 A * | 9/1947 | Trotter | B64C 27/82 416/25 |
| 4,086,768 A * | 5/1978 | Eickmann | B60K 17/10 244/53 R |
| 8,955,797 B2 * | 2/2015 | Buono | B64C 27/12 244/60 |
| 2006/0145482 A1 * | 7/2006 | Roethler | B60K 6/12 290/40 C |
| 2007/0205321 A1 * | 9/2007 | Waide | B64D 35/04 244/17.23 |

(Continued)

*Primary Examiner* — Medhat Badawi
*Assistant Examiner* — Vicente Rodriguez
(74) *Attorney, Agent, or Firm* — Shackelford, Bowen, McKinley & Norton, LLP (57) ABSTRACT

An aircraft includes a variable-speed gearbox. The variable-speed gearbox includes a low-speed gear train and a high-speed gear train, each gear train of which is configured to selectively provide torque from an engine of the aircraft to a proprotor. The variable-speed gearbox also includes a hydraulic system configured to provide torque to the proprotor. The hydraulic system includes a hydraulic pump driven by the engine of the tiltrotor aircraft and a variable-displacement motor driven by a hydraulic fluid from the hydraulic pump.

11 Claims, 8 Drawing Sheets

(56) References Cited

U.S. PATENT DOCUMENTS

2014/0034781 A1* 2/2014 Kouros .................. B64D 27/24
                                                244/60
2018/0215462 A1* 8/2018 Fenny ..................... B64C 27/50
2019/0016451 A1* 1/2019 Ehinger ................... F02C 7/36

* cited by examiner

VARIABLE-SPEED GEAR BOX WITH HYDRAULIC SYSTEM FOR TILTROTOR AIRCRAFT

BACKGROUND

This section provides background information to facilitate a better understanding of the various aspects of the disclosure. It should be understood that the statements in this section of this document are to be read in this light, and not as admissions of prior art.

Powered lift rotorcrafts such as helicopters and tiltrotors use lifting forces generated by wings or rotor blades that revolve around a mast. In a conventional rotorcraft, rotor blades are powered by one or more engines by way of a transmission. The speed of the transmission input is reduced using one or more fixed-ratio reduction stages such that the speed of the output powering the rotor is lower than the input speed by a fixed ratio. Optimization of rotorcraft performance, including noise, range, and efficiency, can be accomplished by varying rotor speed. Rotor speed can be varied by changing engine speed and/or switching between gear ratios within the transmission.

SUMMARY

An example of a variable-speed drive system for a tiltrotor includes a low-speed gear train and a high-speed gear train, each of which is configured to selectively provide torque from an engine of the aircraft to a proprotor. The variable-speed drive system also includes a hydraulic system configured to provide torque to the proprotor.

An example of a tiltrotor aircraft with a variable-speed gearbox includes a variable-speed gearbox with a low-speed gear train and a high-speed gear train, each gear train of which is configured to selectively provide torque from an engine of the aircraft to a proprotor. The variable-speed gearbox also includes a hydraulic system configured to provide torque to the proprotor. The hydraulic system includes a hydraulic pump driven by the engine of the tiltrotor aircraft and a variable-displacement motor driven by a hydraulic fluid from the hydraulic pump.

An example of a method of changing a speed of a proprotor using a variable-speed gearbox includes closing a bypass valve to direct hydraulic fluid from a hydraulic pump to a variable-displacement motor, decoupling a high-speed gear train from an engine, increasing a displacement of the variable-displacement motor to increase an amount of torque provided to the proprotor, opening a bypass valve to allow hydraulic fluid from the hydraulic pump to bypass the variable-displacement motor, and coupling a low-speed gear train with the engine to transmit torque from an engine to the proprotor via the low-speed gear train.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
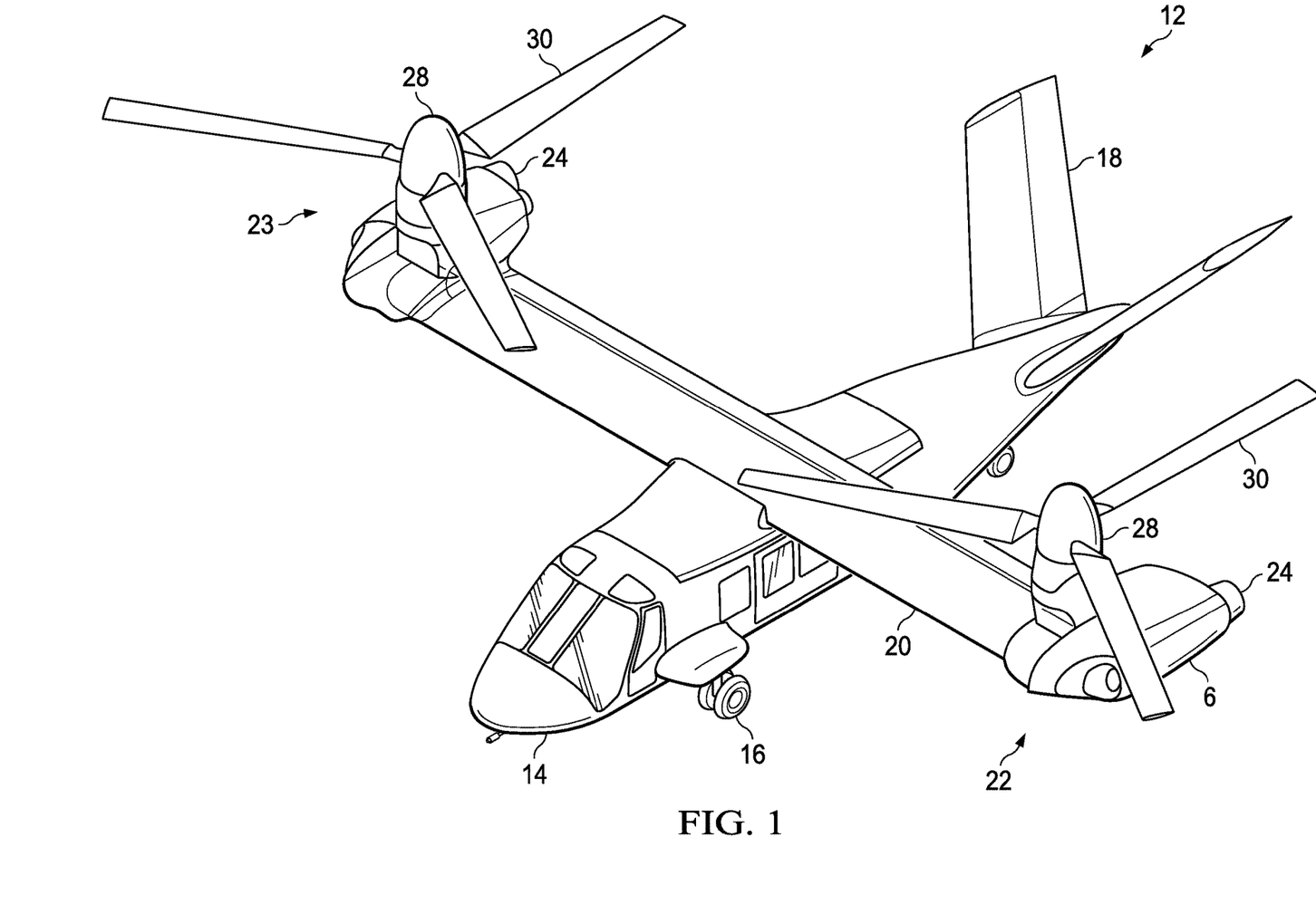
FIGS. 1 and 2 illustrate examples of a tiltrotor aircraft that can implement fixed engine variable-speed tiltrotor drive systems according to aspects of the disclosure.
Figure 2:
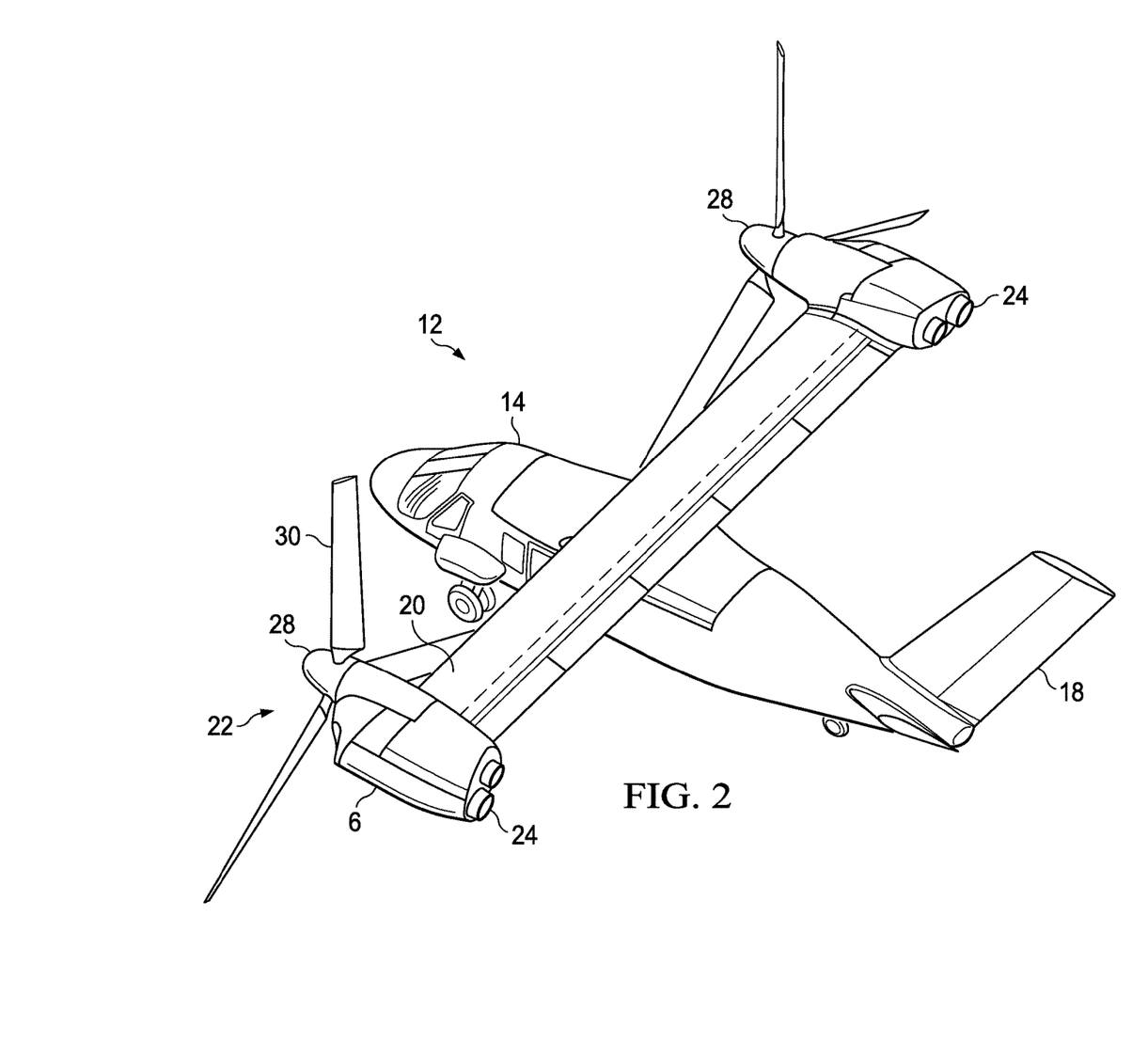

FIGS. 1 and 2 illustrate a tiltrotor aircraft 12 that can incorporate a variable-speed gearbox drive system. The tiltrotor aircraft 12 includes a fuselage 14, a landing gear 16, a tail member 18, a wing 20, a propulsion system 22, and a propulsion system 23. Each propulsion system 22 and 23 includes a fixed engine 24, a variable-speed gearbox (see FIGS. 3-8), and a rotatable drive system referred to generally as proprotor 28. Each proprotor 28 has a plurality of rotor blades 30. The position of proprotors 28, as well as the pitch of rotor blades 30, can be selectively controlled in order to selectively control direction, thrust, and lift of tiltrotor aircraft 12. Each engine 24 can be housed and supported in an engine nacelle 6. Each engine nacelle 6 can include an inlet, aerodynamic fairings, and exhaust, as well as other structures and systems to support and facilitate the operation of engine 24.

FIG. 1 illustrates tiltrotor aircraft 12 in helicopter mode, in which the proprotors 28 are positioned substantially vertical to provide a lifting thrust. FIG. 2 illustrates tiltrotor aircraft 12 in an airplane mode with proprotors 28 are positioned substantially horizontal to provide a forward thrust in which a lifting force is supplied by wing 20. It should be appreciated that tiltrotor aircraft can be operated such that the proprotors 28 are selectively positioned between airplane mode and helicopter mode, which can be referred to as a conversion mode.

Propulsion system 22 is substantially symmetric to the propulsion system 23; therefore, for sake of efficiency certain features will be disclosed only with regard to propulsion system 22. However, one of ordinary skill in the art would fully appreciate an understanding of propulsion system 23 based upon the disclosure herein of propulsion system 22. Further, propulsion systems 22 and 23 are illustrated in the context of tiltrotor aircraft 12; however, propulsion systems 22 and 23 can be implemented on other tiltrotor aircraft or fix rotor aircraft, such as helicopters and airplanes. For example, an embodiment may include a quad tiltrotor that has an additional wing member aft of wing 20; the additional wing member can have additional propulsion systems similar to propulsion systems 22 and 23. In another embodiment, propulsion systems 22 and 23 can be used with an unmanned version of tiltrotor aircraft 12. Further, propulsion systems 22 and 23 can be integrated into a variety of tiltrotor aircraft configurations.

With reference generally to FIGS. 3-8, propulsion system 22 includes a fixed-drive system 8 coupled to the proprotor 28. Fixed-drive system 8 includes an engine 24 that is fixed relative to wing 20. Engine 24 has an engine output shaft 32 that transmits torque to variable-speed gearbox 26. Variable-speed gearbox 26 is coupled to proprotor 28 via an output shaft 36. Engine 24 provides torque to proprotor 28 through variable-speed gearbox 26.

Variable-speed gearbox 26 includes a high-speed gear train 40, a low-speed gear train 50, a hydraulic pump gear train 60, and a variable-displacement motor gear train 70. Gear trains 40, 50, 60, and 70 are configured to transmit torque to output shaft 36. Operation of gear trains 40, 50, 60, and 70 is discussed in more detail below. Variable-speed gearbox 26 also includes a hydraulic system 29 that is configured to provide torque to proprotor 28.

High-speed gear train 40 includes a sprag clutch 41, a spreader cam 42, a gear 43, and a gear 44, each of which is disposed on a shaft. Sprag clutch 41 is coupled to an end of engine output shaft 32 to transfer torque between engine 24 and high-speed gear train 40. Spreader cam 42 allows sprag clutch 41 to be selectively locked open to prevent sprag clutch 41 from transferring torque from engine 24 to proprotor 28. Gear 43 meshes with low-speed gear train 50 to permit torque to be provided to proprotor 28 via the low-speed gear train 50. Gear 44 meshes with hydraulic pump gear train 60 to transfer torque from gear trains 40 and 50 to proprotor 28.

Low-speed gear train 50 includes a sprag clutch 51 and a gear 52, each of which is disposed on a shaft 53. Sprag clutch 51 is coupled to an end of engine output shaft 34 to transfer torque between engine 24 and low-speed gear train 50. Gear 52 meshes with gear 43 to permit torque to be provided to proprotor 28 via the low-speed gear train 50.

Hydraulic pump gear train 60 includes gears 61, 62, and 63, each of which is disposed on a shaft 64. Gear 61 meshes with a gear 37 to transfer torque from variable-speed gearbox 26 to proprotor 28. Gear 62 meshes with variable-displacement motor drive train 70 to allow a variable-displacement motor 80 of the hydraulic system 29 to provide torque to proprotor 28, the operation of which will be discussed in more detail below. Gear 63 meshes with gear 44 to allow transfer of torque from gear train 40 to gear train 60. Shaft 64 is coupled to an output of a hydraulic pump 90 of the hydraulic system 29, the operation of which will be discussed in more detail below.

Variable-displacement motor gear train 70 includes a gear 71 and a sprag clutch 72, each of which is disposed on a shaft 73. Gear 71 meshes with gear 62 to provide torque from variable-displacement motor 80 to proprotor 28. Sprag clutch 72 is coupled to end of an output shaft 81 of variable-displacement motor 80. When torque is not being supplied to proprotor 28 by variable-displacement motor 80, sprag clutch 72 is configured to be in an overrun condition.

When torque is being generated by variable-displacement motor 80, sprag clutch 72 engages shaft 81 and torque is transferred to proprotor 28.

Under certain conditions hydraulic pump 90 provides pressurized hydraulic fluid to variable-displacement motor 80. When pressurized hydraulic fluid is provided to variable-displacement motor 80, torque is generated by variable-displacement motor 80 and transmitted to proprotor 28. Hydraulic pump 90 is illustrated in FIGS. 3-8 as a radial piston pump. In other aspects, other types of hydraulic pumps could be used. Torque is generated by variable-displacement motor 80 in response to hydraulic fluid being pumped therethrough by hydraulic pump 90. Hydraulic fluid exits variable-displacement motor 80 via hydraulic line 82 and enters a heat exchanger 83. Heat exchanger 83 cools hydraulic fluid after the hydraulic fluid exits variable-displacement motor 80. The hydraulic fluid exits heat exchanger 83 and enters a hydraulic fluid reservoir 84. Hydraulic fluid reservoir 84 holds excess hydraulic fluid and has a variable volume to account for any volume changes in the hydraulic fluid. As illustrated in FIGS. 3-8, hydraulic fluid reservoir 84 includes a membrane that can move in response to changes in hydraulic fluid volume. Hydraulic line 85 couples hydraulic fluid reservoir 84 to hydraulic pump 90. Hydraulic line 86 directs pressurized hydraulic fluid from hydraulic pump 90 to variable-displacement motor 80.

An actuator 87 controls displacement of variable-displacement motor 80 by tilting a plate 88. Plate 88 is coupled to ends of a plurality of pistons disposed within variable-displacement motor 80. Tilting plate 88 changes a displacement of variable-displacement motor 80 by changing a stroke of the pistons as they rotate within variable-displacement motor 80. When plate 88 is flat (e.g. see FIG. 4), motor displacement is zero.

A bypass valve 89 is disposed between hydraulic lines 82 and 86. When bypass valve 89 is closed, hydraulic fluid flows from hydraulic pump 90 to variable-displacement motor 80. When bypass valve 89 is open, hydraulic fluid bypasses variable-displacement motor 80 and little to no torque can be generated by variable-displacement motor 80.

Hydraulic pump 90 includes a plurality of radial pistons 91 that reciprocate within a cylinder block 92 as cylinder block 92 rotates. Cylinder block 92 is rotated by a gear 94 that meshes with gear 33 that is turned by engine 24. As cylinder block 92 rotates, radial pistons 91 ride upon a drive cam 93, which causes radial pistons 91 to reciprocate within cylinder block 92. The reciprocal action of radial pitons is used to pump hydraulic fluid. Cross-section A-A illustrates a cross-sectional view of hydraulic pump 90 through line A-A. Cylinder block 92 is coupled to shaft 64 and torque is applied to shaft 64 when cylinder block 92 rotates.

As discussed above, tiltrotor aircraft 12 can be operated in helicopter mode (FIG. 1) and airplane mode (FIG. 2). Requirements for torque/rotor rpm for helicopter mode and airplane mode can be different. For example, helicopter mode may require proprotors 28 to operate at high speed and low torque relative to airplane mode. Similarly, airplane mode may require proprotor 28 to operate at low speed and high torque relative to helicopter mode. In order to compensate for the difference in power requirements for helicopter and airplane modes, engines 24 can be operated at different rpms. While this method of power management may work, it does not allow engines 24 to operate at or near their maximum efficiency. Using variable-speed gearbox 26 permits engines 24 to operate more efficiently and to transfer between high-speed operation and low-speed operation while continuously providing torque to proprotors 28.

For example, during helicopter mode torque is transmitted from engines 24 to proprotors 28 via high-speed gear trains 40 and during airplane mode torque is transmitted from engines 24 to proprotors 28 via low-speed gear trains 50. Operating in this manner allows engines 24 to maintain their speed, and thus their efficiency, while still providing the desired speed/torque for helicopter and airplane modes. In order to smoothly transition between high-speed gear trains 40 and low-speed gear trains 50, variable-speed gear boxes 26 use hydraulic systems 29 to temporarily supply torque to proprotors 28 to insure that torque is always supplied to proprotors 28 as gearboxes 26 transition between high-speed gear trains 40 and low-speed gear trains 50. During this transition period, high-speed gear trains 40 are disengaged and low-speed gear trains 50 are engaged. The process of transitioning from high-speed gear trains 40 to low-speed gear trains 50 is illustrated in FIGS. 3-8.

Figure 3:
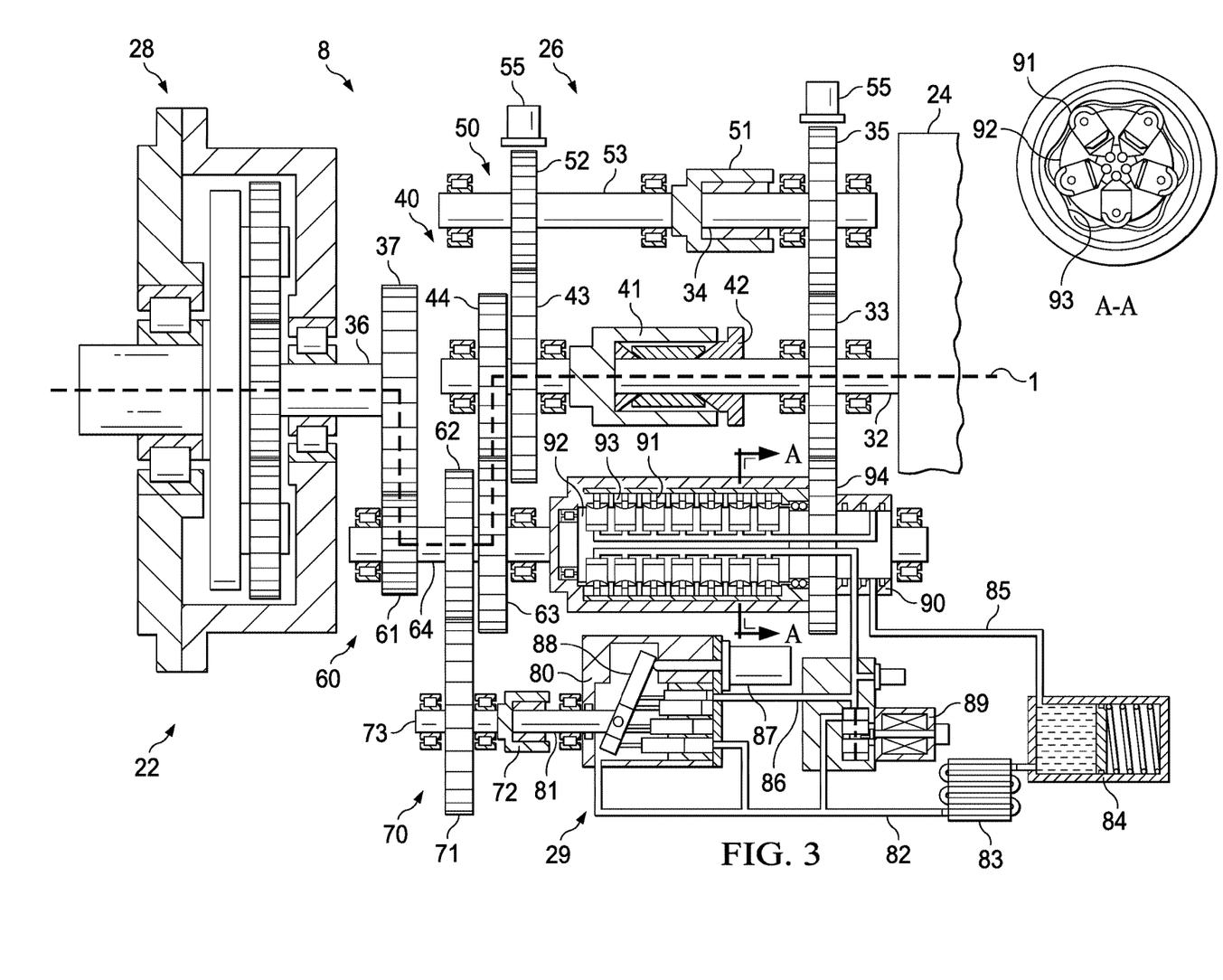
FIGS. 3-8 are schematics illustrating a variable-speed gearbox according to aspects of the disclosure.

Referring now to FIG. 3, one fixed-drive system 8 of tiltrotor aircraft 12 is illustrated. Operation of a single fixed-drive system 8 will be discussed with the understanding that the other fixed drive system 8 of tiltrotor aircraft 12 operates in a similar manner. In the configuration of FIG. 3, fixed drive system 8 is operating in helicopter mode. In helicopter mode, fixed-drive system 8 is configured to transmit torque from engine 24 to proprotor 28 via high-speed gear train 40. Torque transmission path 1 illustrates the path of torque from engine 24 to proprotor 28. As configured in FIG. 3, torque is not transmitted through low-speed gear train 50 because sprag clutch 51 is in an overrun condition and does not transmit torque. Torque is not transmitted through hydraulic pump 90 because hydraulic pump 90 is operating in a slip condition as bypass valve 89 is open. Gear 94 is configured to rotate cylinder block 92 at a slightly faster speed than high-speed gear train 40. For example, gear 94 can be sized to rotate cylinder block 92 at approximately 105% of the speed of high speed gear train 40. Because hydraulic pump 90 is operating in a slip condition, hydraulic pump 90 does not overtake high-speed gear train 40 and torque is transmitted from engine 24 to proprotor 28 via high-speed gear train 40.

In FIG. 3, variable-displacement motor 80 is shown operating with plate 88 tilted. Tilting plate 88 causes the pistons within variable-displacement motor 80 to reciprocate as output shaft 81 rotates. As noted above, bypass valve 89 is in the open position and hydraulic fluid from hydraulic pump 90 bypasses variable-displacement motor 80. Because variable-displacement motor 80 is bypassed, little to no torque is provided by variable-displacement motor 80 to proprotor 28 and sprag clutch 72 is in an overrun condition. Even though no torque is being supplied to proprotor 28 by variable-displacement motor 80, tilting plate 88 to cause the pistons within the variable-displacement motor 80 to reciprocate and displace fluid within variable-displacement motor 80, which helps lubricate variable-displacement motor 80.

Figure 4:
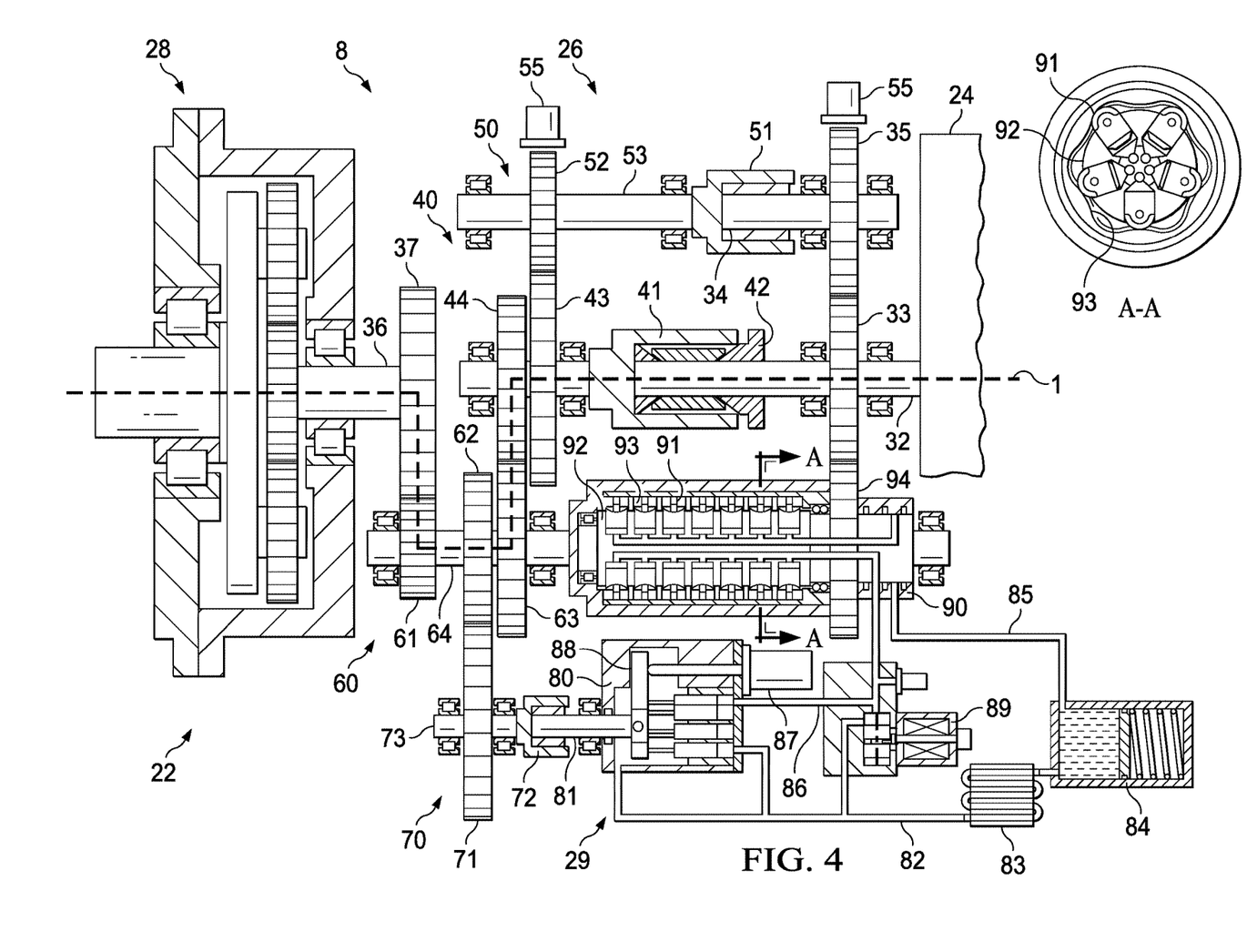

Referring now to FIG. 4, the beginning of the transition from helicopter mode to airplane mode is illustrated. To transition from helicopter mode to airplane mode, plate 88 is tilted to the zero displacement position. In the zero displacement position, the pistons within variable-displacement motor 80 do not reciprocate and no torque is provided to proprotor 28 by variable-displacement motor 80.

Figure 5:
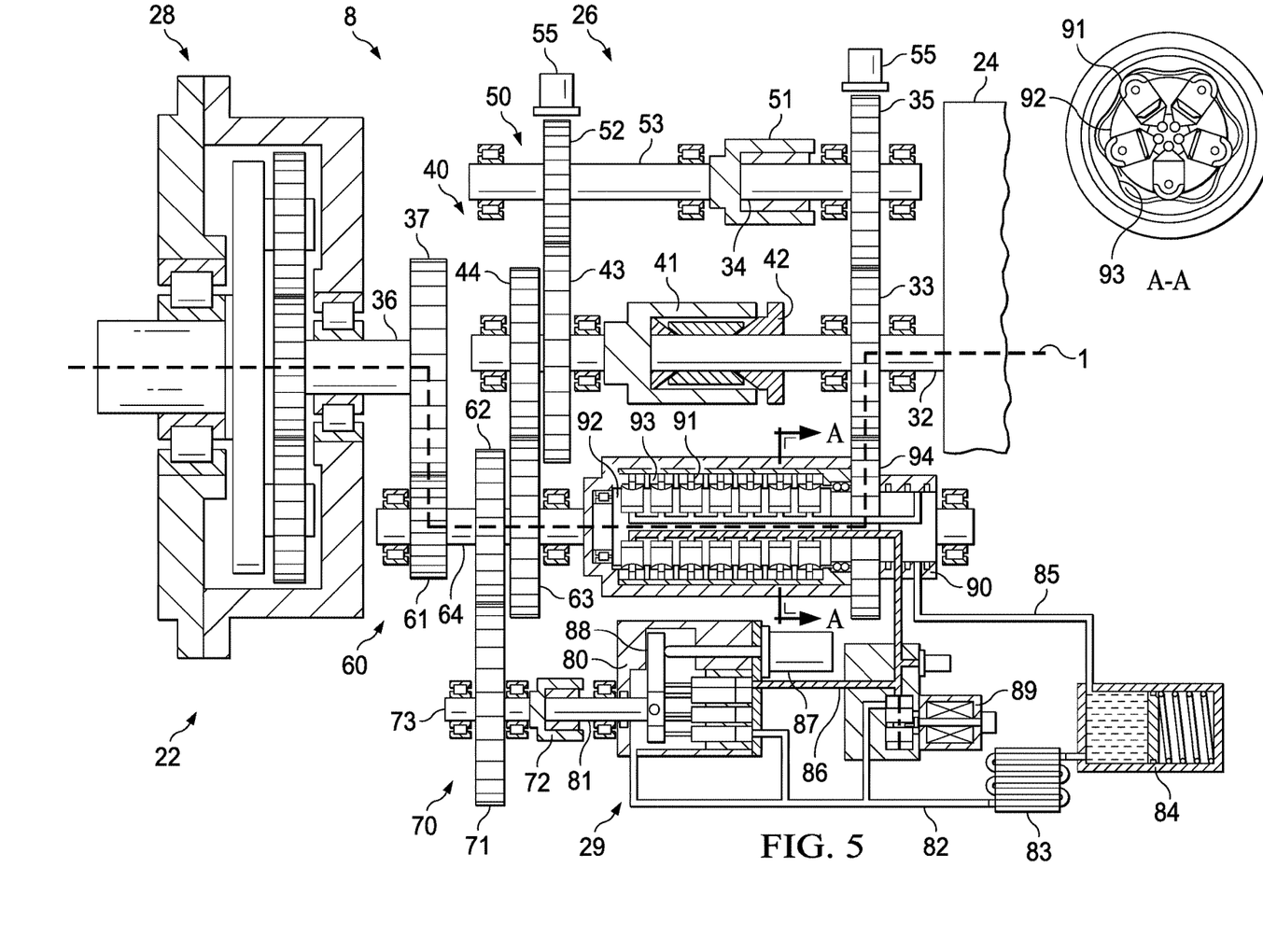

Referring now to FIG. 5, bypass valve 89 closes to direct hydraulic fluid from hydraulic pump 90 into variable-displacement motor 80. With bypass valve 89 closed, slipping of hydraulic pump 90 is reduced and hydraulic pump 90 overtakes high-speed gear train 40 and the speed of proprotor 28 is increased. Sprag clutch 41 is designed to be in an overrun condition when the hydraulic pump 90 is operating as configured in FIG. 5. For example, if gear 94 is sized to drive cylinder block 92 at 105% of the speed of high-speed gear train 40, the speed of proprotor 28 is also 105% of the speed of high-speed gear train 40 and sprag clutch 41 is in an overrun condition and does not transmit torque. As shown in FIG. 5, torque transmission path 1 is now from engine 24, through hydraulic pump 90, and hydraulic pump gear train 60 to proprotor 28.

Figure 6:
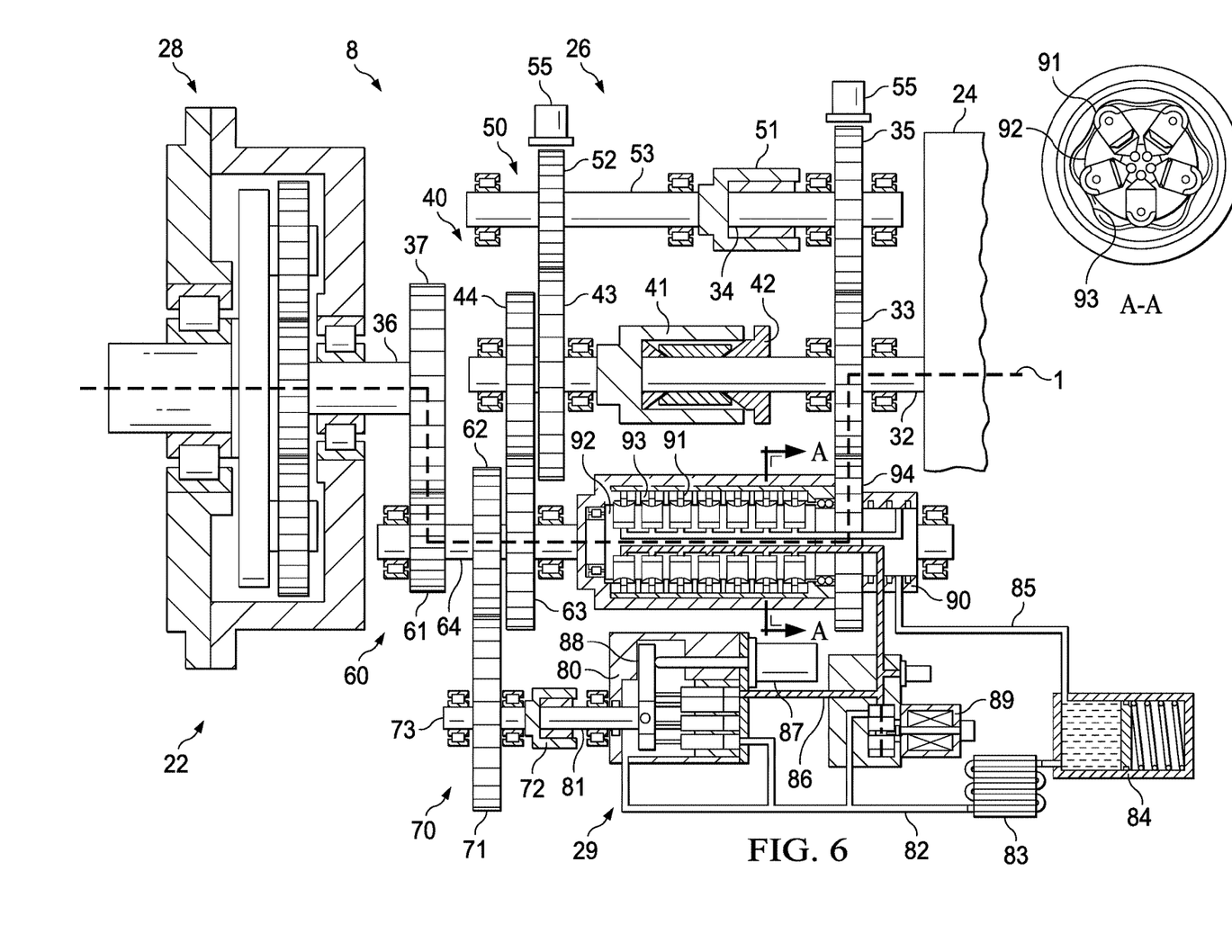

Referring now to FIG. 6, spreader cam 42 is used to disengage sprag clutch 41. Disengaging sprag clutch 41 allows the speed of hydraulic pump 90 to be decreased without sprag clutch 41 re-engaging.

Figure 7:
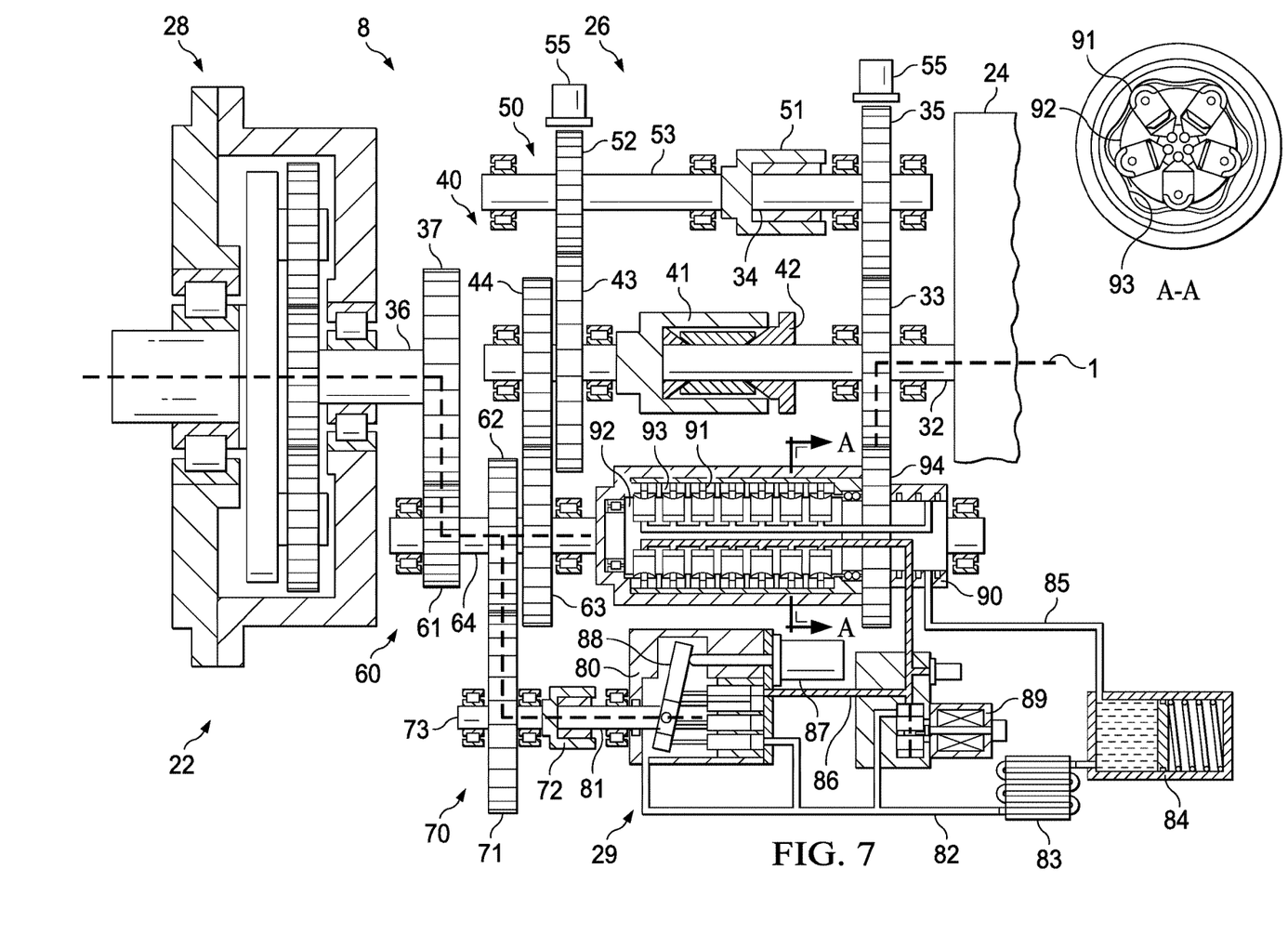

Referring now to FIG. 7, after sprag clutch 41 has been disengaged by spreader cam 42, displacement of variable-displacement motor 80 is increased by tilting plate 88. As plate 88 is tilted, variable-displacement motor 80 begins to generate torque. The speed of hydraulic pump 90 is slowly decreased as variable-displacement motor 80 generates more torque. In some aspects, the speed of proprotor 28 is reduced to about 60% of the speed of helicopter mode. In other aspects, the speed of proprotor 28 may be reduced to a different value (e.g., any value between about 40% and 80%).

Figure 8:
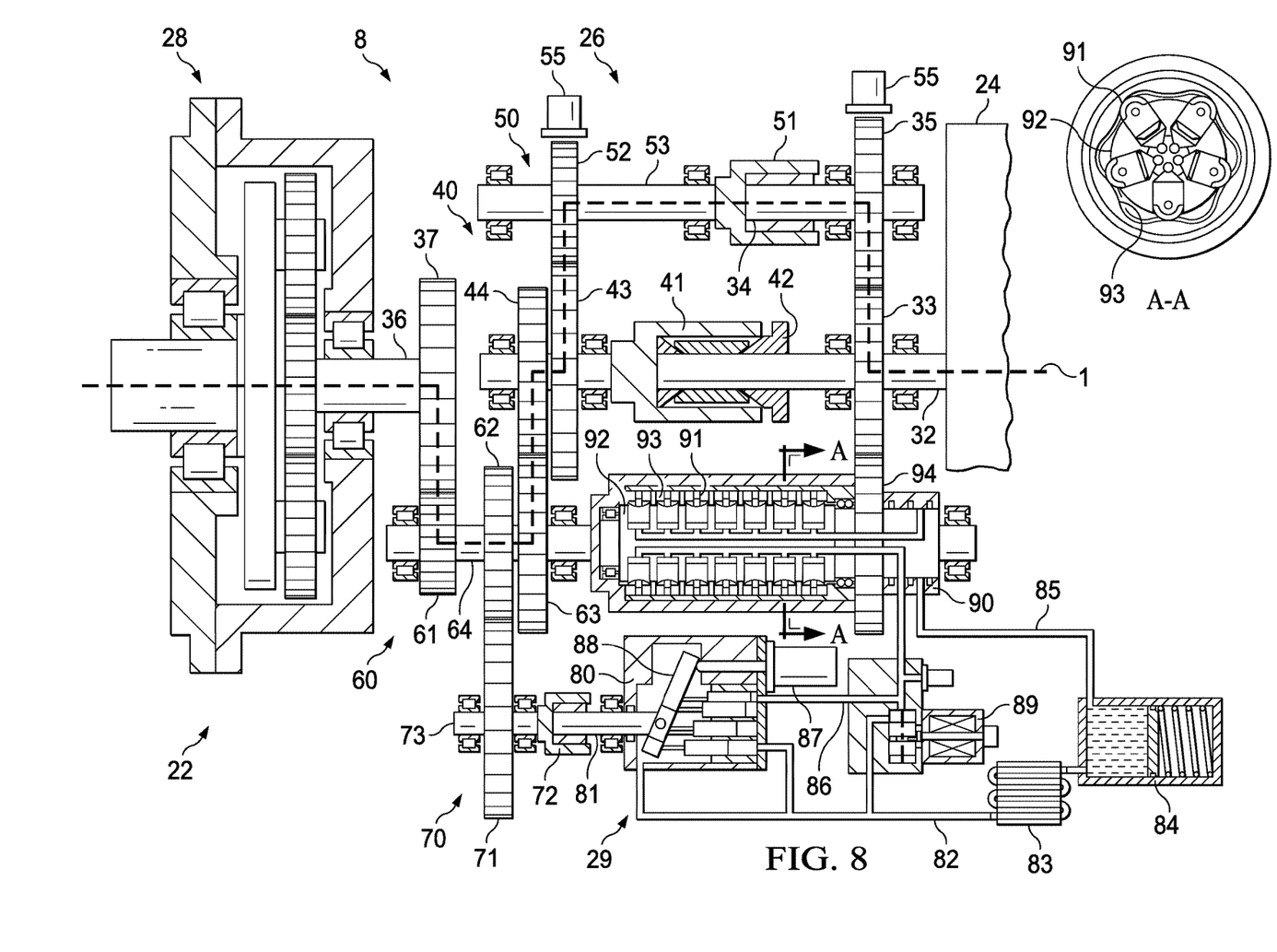

Referring now to FIG. 8, once the speed of proprotor 28 has been lowered to the desired speed, bypass valve 89 is closed and sprag clutch 51 transitions out of an overrun condition and low-speed gear train 50 begins transmitting torque from engine 24 to proprotor 28. With bypass valve 89 closed, torque transmission path 1 is from engine 24 through low-speed gear train 50 and hydraulic pump gear train 60 to proprotor 28. Fixed drive system 8 is now configured for helicopter mode. To transition back to helicopter mode, the process outlined above is reversed.

Variable-speed gearbox 26 has been discussed above for illustrative purposes. Components of variable-speed gearbox can be modified or changed without departing from the aspects of the disclosure. For example, one or more of the various sprag clutches disclosed above could be replaced with other types of couplings, such as spline drive couplings. In some aspects, sprag clutches offer a failsafe mode of operation in the event that hydraulic system 29 fails. For example, sprag clutches can be engaged and disengaged without using hydraulic system 29 in the manner described above by increasing and decreasing the speed of the engine to cause the sprag clutches to transition between engaged and overrun states.

In some aspects, hydraulic system 29 can be operated as a backup power supply in the event of a malfunction of other gearbox components. For example, as long as hydraulic pump 90 has a power source, hydraulic pump 90 and variable-displacement motor 80 can be used to provide torque to proprotor 28.

Additionally, variable-speed gearbox 26 can include additional gear trains other than just high-speed gear train 40 and low-speed gear train 50. For example, a third gear-train could be included that has a ratio that is above high-speed gear train 40, between high-speed gear train 40 and low-speed gear train 50, or below low-speed gear train 50.

Other additions to variable-speed gear box 26 include a health monitoring system. The health monitoring system can include one or more sensors configured to monitor pressure and temperature of the hydraulic fluid, speed of one or more gear trains (e.g., by speed sensors like sensors 55 shown in FIG. 3, other speed sensors can be positioned in variable-speed gearbox 26), and the like.

Other modifications to variable-speed gearbox 26 include replacing radial piston pump 90 with a constant ratio hydraulic system with an adjustable bypass passages to adjust fluid flow through the motor to control torque output of the constant ratio hydraulic system. Additionally, hydraulic system 29 can be modified to mesh with low-speed gear train 50 instead of high-speed gear train 40.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A variable-speed gearbox for an aircraft, the variable-speed gearbox comprising:
   a low-speed gear train and a high-speed gear train, each of which is configured to selectively provide torque from an engine of the aircraft to a proprotor;
   a hydraulic system configured to provide torque to the proprotor;
   a hydraulic pump driven by the engine of the aircraft;
   a variable-displacement motor driven by a hydraulic fluid from the hydraulic pump;
   a hydraulic pump gear train that meshes with at least one of the high-speed and low-speed gear trains and is coupled to the hydraulic pump; and
   a variable-displacement motor gear train that meshes with the hydraulic pump gear train and is coupled to an output shaft of the variable-displacement motor.

2. The variable-speed gearbox of claim 1, wherein the low-speed gear train comprises a sprag clutch coupled between the low-speed gear train and the engine of the aircraft.

3. The variable-speed gearbox of claim 1, wherein the high-speed gear train comprises a sprag clutch coupled between the high-speed gear train and the engine of the aircraft.

4. The variable-speed gearbox of claim 1, wherein the hydraulic system comprises a bypass valve coupled between the hydraulic pump and the variable-displacement motor and configured to allow hydraulic fluid to bypass the variable-displacement motor.

5. The variable-speed gearbox of claim 1, wherein the variable-displacement motor gear train comprises a sprag clutch coupled to the variable-displacement motor.

6. The variable-speed gearbox of claim 1, wherein the hydraulic system further comprises:
   a heat exchanger coupled between the variable-displacement motor and the hydraulic pump; and
   a hydraulic fluid reservoir coupled between the variable-displacement motor and the hydraulic pump.

7. A tiltrotor aircraft comprising:
   a first and a second variable-speed gearbox, each gearbox comprising:
      a low-speed gear train and a high-speed gear train, each of which is configured to selectively provide torque from an engine of the tiltrotor aircraft to a proprotor;
      a hydraulic system configured to provide torque to the proprotor, the hydraulic system comprising a hydraulic pump driven by the engine of the tiltrotor aircraft and a variable-displacement motor driven by a hydraulic fluid from the hydraulic pump;
      a hydraulic pump gear train that meshes with at least one of the high-speed and low-speed gear trains and is coupled to the hydraulic pump; and
      a variable-displacement motor gear train that meshes with the hydraulic pump gear train and is coupled to an output shaft of the variable-displacement motor.

8. The tiltrotor aircraft of claim 7, wherein the low-speed gear train comprises a sprag clutch coupled between the low-speed gear train and the engine of the tiltrotor aircraft.

9. The tiltrotor aircraft of claim 7, wherein the high-speed gear train comprises a sprag clutch coupled between the high-speed gear train and the engine of the tiltrotor aircraft.

10. The tiltrotor aircraft of claim 7, wherein a variable-displacement motor gear train coupled to the variable-displacement motor comprises a sprag clutch coupled to the variable-displacement motor.

11. The tiltrotor aircraft of claim 7, wherein the hydraulic system comprises a bypass valve coupled between the hydraulic pump and the variable-displacement motor and configured to allow hydraulic fluid to bypass the variable-displacement motor.

* * * * *